United States Patent
Fan et al.

(10) Patent No.: US 12,161,969 B2
(45) Date of Patent: Dec. 10, 2024

(54) REDOX REACTION FACILITATED CARBON DIOXIDE CAPTURE FROM FLUE GAS AND CONVERSION TO CARBON MONOXIDE

(71) Applicant: OHIO STATE INNOVATION FOUNDATION, Columbus, OH (US)

(72) Inventors: Liang-Shih Fan, Columbus, OH (US); Deven Baser, Columbus, OH (US); Vedant Shah, Columbus, OH (US); Zhuo Cheng, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 395 days.

(21) Appl. No.: 17/639,884

(22) PCT Filed: Sep. 3, 2020

(86) PCT No.: PCT/US2020/049105
§ 371 (c)(1),
(2) Date: Mar. 2, 2022

(87) PCT Pub. No.: WO2021/046156
PCT Pub. Date: Mar. 11, 2021

(65) Prior Publication Data
US 2022/0331736 A1   Oct. 20, 2022

Related U.S. Application Data

(60) Provisional application No. 62/895,109, filed on Sep. 3, 2019.

(51) Int. Cl.
*B01D 53/62* (2006.01)
*B01D 53/79* (2006.01)

(52) U.S. Cl.
CPC ............ *B01D 53/62* (2013.01); *B01D 53/79* (2013.01); *B01D 2251/11* (2013.01);
(Continued)

(58) Field of Classification Search
CPC ............ C01B 3/36; B01D 53/62; B01D 53/79
See application file for complete search history.

(56) References Cited

U.S. PATENT DOCUMENTS

| 971,206 A | 9/1910 | Messerschmitt |
|---|---|---|
| 1,078,686 A | 11/1913 | Lane |

(Continued)

FOREIGN PATENT DOCUMENTS

| CN | 1329761 A | 1/2001 |
|---|---|---|
| CN | 1325319 A | 12/2001 |

(Continued)

OTHER PUBLICATIONS

European Patent Office Extended Search Report for Application No. 20861500.5 dated Aug. 7, 2023 (9 pages).

(Continued)

*Primary Examiner* — Sharon Pregler
(74) *Attorney, Agent, or Firm* — Michael Best & Friedrich LLP

(57) ABSTRACT

Exemplary reactor systems may include multiple reactors in fluid communication. Oxygen carrier particles comprising a support material and metal oxide can be provided to a first reactor along with flue gas comprising carbon dioxide (CO2). An output of the first reactor is free or substantially free of carbon dioxide (CO2). The oxygen carrier particles can then be provided to one or more reactors in the system along with a hydrocarbon stream and, in some instances, an oxidizing stream. Outlets from these one or more reactors may include hydrogen gas (H2), carbon monoxide (CO), and/or other species, depending upon the content of the hydrocarbon streams and the oxidizing streams.

17 Claims, 11 Drawing Sheets

(52) U.S. Cl.
CPC .. *B01D 2251/208* (2013.01); *B01D 2257/504* (2013.01); *B01D 2258/0283* (2013.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,160,663 A | 7/1979 | Hsieh |
| 4,212,452 A | 7/1980 | Hsieh |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 4,957,523 A | 9/1990 | Zarate et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,545,251 A | 8/1996 | Knop |
| 5,584,615 A | 12/1996 | Micklich |
| 5,630,368 A | 5/1997 | Wagoner |
| 5,730,763 A | 3/1998 | Manulescu et al. |
| 5,762,681 A | 6/1998 | Lee et al. |
| 5,770,310 A | 6/1998 | Nogochi et al. |
| 5,827,496 A | 10/1998 | Lyon |
| 5,858,210 A | 1/1999 | Richardson |
| 5,891,415 A | 4/1999 | Alkhazov et al. |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B2 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 2/2006 | Fan et al. |
| 7,244,399 B2 | 7/2007 | Myohanen et al. |
| 7,404,942 B2 | 7/2008 | Sanfilippo et al. |
| 7,429,373 B2 | 9/2008 | Pez et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 9,777,920 B2 | 10/2017 | Fan et al. |
| 9,790,605 B2 | 10/2017 | Sheehan et al. |
| 9,903,584 B2 | 2/2018 | Fan et al. |
| 10,010,847 B2 | 7/2018 | Fan et al. |
| 10,081,772 B2 | 9/2018 | Fan et al. |
| 10,144,640 B2 | 12/2018 | Fan et al. |
| 10,501,318 B2 | 12/2019 | Fan et al. |
| 10,865,346 B2 | 12/2020 | Fan et al. |
| 11,111,143 B2 | 9/2021 | Fan et al. |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0102254 A1 | 6/2003 | Eijsbouts et al. |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |

(56) References Cited

U.S. PATENT DOCUMENTS

| | | |
|---|---|---|
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0071314 A1 | 3/2013 | Gupta |
| 2013/0085365 A1 | 4/2013 | Marashdeh et al. |
| 2013/0125462 A1 | 5/2013 | Greiner et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0072917 A1* | 3/2014 | Fan ............ F23C 10/32 431/170 |
| 2014/0134096 A1 | 5/2014 | Angelini et al. |
| 2014/0144082 A1 | 5/2014 | Fan et al. |
| 2014/0275297 A1 | 9/2014 | Velazquez-Vargas et al. |
| 2015/0238915 A1 | 8/2015 | Fan et al. |
| 2015/0291420 A1 | 10/2015 | Colozzi et al. |
| 2015/0343416 A1 | 12/2015 | Fadhel et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0115026 A1 | 4/2016 | Angelini et al. |
| 2016/0268616 A1 | 9/2016 | Fan et al. |
| 2017/0015554 A1 | 1/2017 | Siengchum et al. |
| 2017/0106355 A1 | 4/2017 | Colozzi et al. |
| 2018/0296978 A1 | 10/2018 | Peck et al. |
| 2018/0353933 A1 | 12/2018 | Wendland et al. |
| 2019/0003704 A1 | 1/2019 | Aranda et al. |
| 2019/0152778 A1 | 5/2019 | Fan et al. |
| 2019/0232220 A1 | 8/2019 | Fan et al. |
| 2020/0156032 A1 | 5/2020 | Fan et al. |

FOREIGN PATENT DOCUMENTS

| | | |
|---|---|---|
| CN | 1454711 A | 11/2003 |
| CN | 1501534 A | 6/2004 |
| CN | 101389734 A | 3/2009 |
| CN | 101426885 A | 5/2009 |
| CN | 102187153 A | 9/2011 |
| CN | 102388005 A | 3/2012 |
| CN | 102612625 A | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 A1 | 11/1985 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 A2 | 6/2008 |
| EP | 2279785 A2 | 2/2011 |
| EP | 2441816 A1 | 4/2012 |
| EP | 2450420 A1 | 5/2012 |
| EP | 2495030 A2 | 9/2012 |
| EP | 2515038 A1 | 10/2012 |
| EP | 2601443 A0 | 6/2013 |
| EP | 1976633 B1 | 3/2014 |
| FR | 2924035 A1 | 5/2009 |
| JP | H03-68898 A | 3/1991 |
| JP | H10249153 A | 9/1998 |
| JP | 2006-502957 A | 1/2006 |
| KR | 20060096609 A | 9/2006 |
| KR | 101364823 B1 | 2/2014 |
| TW | 406055 B | 9/2000 |
| TW | 426728 B | 3/2001 |
| WO | WO1990/013773 A1 | 11/1990 |
| WO | WO1999/065097 A1 | 12/1999 |
| WO | WO2000/022690 A1 | 4/2000 |
| WO | WO2000/068339 A1 | 11/2000 |
| WO | WO2001/042132 A1 | 6/2001 |
| WO | WO2003/070629 A1 | 8/2003 |
| WO | WO2007/082089 A2 | 7/2007 |
| WO | WO2007/122498 A2 | 11/2007 |
| WO | WO2007/134075 A2 | 11/2007 |
| WO | WO2008/019079 A2 | 2/2008 |
| WO | WO2008/071215 A1 | 6/2008 |
| WO | WO2008/082312 A1 | 7/2008 |
| WO | WO2008/115076 A2 | 9/2008 |
| WO | WO2009/007200 A2 | 1/2009 |
| WO | WO2009/008565 A1 | 1/2009 |
| WO | WO2009/009388 A1 | 1/2009 |
| WO | WO2009/021258 A1 | 2/2009 |
| WO | WO2009/023515 A2 | 2/2009 |
| WO | WO2009/114309 A2 | 9/2009 |
| WO | WO2010/037011 A2 | 4/2010 |
| WO | WO2010/063923 A2 | 6/2010 |
| WO | WO2010/126617 A1 | 11/2010 |
| WO | WO2011/021161 A2 | 2/2011 |
| WO | WO2011/031752 A2 | 3/2011 |
| WO | WO2011/031755 A1 | 3/2011 |
| WO | WO2011/084734 A2 | 7/2011 |

(56) References Cited

FOREIGN PATENT DOCUMENTS

| | | |
|---|---|---|
| WO | WO2012/064712 A1 | 5/2012 |
| WO | WO2012/077978 A2 | 6/2012 |
| WO | WO2012/144899 A1 | 10/2012 |
| WO | WO2012/155054 A1 | 11/2012 |
| WO | WO2012/155059 A1 | 11/2012 |
| WO | WO2013/040645 A1 | 3/2013 |
| WO | WO2014/085243 A1 | 6/2014 |
| WO | WO2014/091024 A1 | 6/2014 |
| WO | WO2014/152814 A1 | 9/2014 |
| WO | WO2011/153568 A1 | 12/2014 |
| WO | WO2014/195904 A1 | 12/2014 |
| WO | 2015/016956 A1 | 2/2015 |
| WO | WO2016/053941 A1 | 4/2016 |
| WO | WO2017/162427 A1 | 9/2017 |
| WO | WO2018/166812 A1 | 9/2018 |
| WO | WO2020/210865 A1 | 10/2020 |

OTHER PUBLICATIONS

Ardila-Barragán et al., "Gasification of coal, Chenopodium Album biomass, and co-gasification of a coal-biomass mixture by thermogravimetric-gas analysis," Revista Facultad de Ingeniería, 2019, 28(53): 53-77.
Bhaskar et al., "Thermochemical Route for Biohydrogen Production," Biohydrogen, 2013, Chapter 12: 285-316.
Brasington et al., "Cost and Performance Baseline for Fossil Energy Plants-vol. 2: Coal to Synthetic Natural Gas and Ammonia," National Energy Technology Laboratory (NETL), Pittsburgh, PA, 2011, 314 pages.
Gnanapragasam et al., "A review of hydrogen production using coal, biomass and other solid fuels," Biofuels, 2017, 8(6): 725-745.
Halmenschlager et al., "Oligomerization of Fischer-Tropsch Tail Gas over H-ZSM-5," Industrial & Engineering Chemistry Research, 2016, 55(51): 13020-13031.
Kumabe et al., "Co-gasification of woody biomass and coal with air and steam" Fuel, 2007, 86(5-6): 684-689.
Nrel, M., Survey and Down-Selection of Acid Gas Removal Systems for the Thermochemical Conversion of Biomass to Ethanol with a Detailed Analysis of an MDEA System. San Francisco, California: Efficiency & Renewable Energy, operated by the Alliance for Sustainable Energy, LLC, 2011, 96 pages.
Pinto et al., "Co-gasification study of biomass mixed with plastic wastes," Fuel, 2002, 81(3): 291-297.
Tong et al., "Iron-based syngas chemical looping process and coal-direct chemical looping process development at Ohio State University," Applied energy, 2014, 113: 1836-1845.
Zhou et al., "Syngas chemical looping process: Dynamic modeling of a moving-bed reducer," AIChE Journal, 2013, 59(9): 3432-3443.
Heliogen, "Heliogen, Replacing fuels with sunlight," <https://heliogen.com/> Accessed Aug. 26, 2020.
Hsieh et al., "250 KWth high pressure pilot demonstration of the syngas chemical looping system for high purity H2 production with CO2 capture," Applied energy, 2018, 230: 1660-1672.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of CU-, Ni-, and Fe- Based Oxygen Carriers Using Syngas (CO + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Abdallah et al., "Comparison of mesoporous silicate supports for the immobilisation and activity of cytochrome c and lipase," J. Mol. Catal. B: Enzym., 2014, 108, 82-88.
Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.
Ahern et al., "Comparison of fenofibratemesoporous silica drug-loading processes for enhanced drug delivery," Eur. J. Pharm. Sci., 2013, 50, 400-409.
Alalwan et al., "Co3O4 nanoparticles as oxygen carriers for chemical looping combustion: a materials characterization approach to understanding oxygen carrier performance," Chemical Engineering Journal, 2017, 319, 279-287.
Alalwan et al., "α-Fe2O3 Nanoparticles as Oxygen Carriers for Chemical Looping Combustion: an Integrated Materials Characterization Approach to Understanding Oxygen Carrier Performance, Reduction Mechanism, and Particle Size Effects," Energy Fuels, 2018, 32, 7959-7970.
Anisimov et al., "Density-functional calculation of effective Coulomb interactions in metals," Phys. Rev. B, 1991, 43, 7570.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Barreca et al., "Methanolysis of styrene oxide catalysed by a highly efficient zirconium-doped mesoporous silica," Appl. Catal. A, 2006, 304, 14-20.
Bell et al., "H2 Production via Ammonia Decomposition Using Non-Noble Metal Catalysts: a Review," Top Catal, 2016, 59, 1438-1457.
Burke et al., "Large pore bi-functionalised mesoporous silica for metal ion pollution treatment," J. Hazard. Mater., 2009, 164, 229-234.
Cao et al., "Investigation of Chemical Looping Combustion by Solid Fuels. 1. Process Analysis," Energy Fuels, 2006, 20(5), pp. 1836-1844.
Carrero et al., "A critical literature review of the kinetics for the oxidative dehydrogenation of propane over well-defined supported vanadium oxide catalysts," ACS Catalysis, 2014, 4: 3357-3380.
Cavani et al., "Oxidative dehydrogenation of ethane and propane: How far from commercial implementation?" Catalysis Today, 2007, 127(1): 113-131.
Cheng et al., "Carbon Dioxide Adsorption and Activation on Ceria (110): A density functional theory study," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Oxygen vacancy promoted methane partial oxidation over iron oxide oxygen carrier in chemical looping process," Phys. Chem. Chem. Phys., 2016, 18, 32418-32428.
Cheng et al., "Propagation of Olefin Metathesis to Propene on WO3 Catalysts: a Mechanistic and Kinetic Study," ACS Catal. 2015, 5, 59-72.
Cho et al., "Comparison of iron-, nickel-, copper- and manganese-based oxygen carriers for chemical-looping combustion," Fuel, 2004, vol. 83, Issue 9, pp. 1215-1225.
Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.
Coleman et al., "Synthesis and characterization of dimensionally ordered semiconductor nanowires within mesoporous silica," J. Am. Chem. Soc., 2001, 123, 7010-7016.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Diego et al., "Development of Cu-based oxygen carriers for chemical-looping combustion," Fuel, 2004, vol. 83, Issue 13, pp. 1749-1757.

(56) References Cited

OTHER PUBLICATIONS

De Klerk, "Gas-to-Liquid Conversion." Natural Gas Conversion Technologies Workshop of ARPA-E. U.S. Department of Energy, Houston, TX. vol. 13 (2012).
Delaney et al., "Development of chemically engineered porous metal oxides for phosphate removal," J. Hazard. Mater., 2011, 185, 382-391.
Delaney et al., "Porous silica spheres as indoor air pollutant scavengers," J. Environ. Monit., 2010, 12, 2244-2251.
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Faezad Othman et al., "Utilization of Low-Grade Iron Ore in Ammonia Decomposition," Procedia Chemistry, 2016, 19:119-124.
Faezad Othman et al., "Utilization of Malaysian Low Grade Iron Ore as Medium for Ammonia Decomposition," ARPN Journal of Engineering and Applied Sciences, 2015, 10(22):17286-17288.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Flynn et al., "Pervaporation performance enhancement through the incorporation of mesoporous silica spheres into PVA membranes," Sep. Purif. Technol., 2013, 118, 73-80.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Forzatti, "Present status and perspectives in de-NOx SCR catalysis." Appl. Catal. A: Gen., 222(1-2), 2001, 221-236.
Gao et al., "Production of syngas via autothermal reforming of methane in a fluidized-bed reactor over the combined $CeO_2$-$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Ghoneim et al., "Review on innovative catalytic reforming of natural gas to syngas," World J. Eng. Technol, 2016, 4(1):116-139.
Go et al., "Hydrogen production from two-step steam methane reforming in a fluidized bed reactor," International Journal of Hydrogen Energy, 2009, vol. 34, p. 1301-1309.
Goellner et al., "Baseline analysis of crude methanol production from coal and natural gas," National Energy Technology Laboratory (NETL), US Department of Energy, 2014, 83 pages.
Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).
Grimme et al., "A consistent and accurate ab initio parametrization of density functional dispersion correction (DFT-D) for the 94 elements H-Pu," J. Chem. Phys., 2010, 132, 19.
Grimme et al., "Effect of the damping function in dispersion corrected density functional theory," J. Comput. Chem., 2011, 32, 1456-1465.
Haque, "Microwave energy for mineral treatment processes—a brief review," International Journal of Mineral Processing, vol. 57, pp. 1-24, 1999.
Henkelman et al., "A climbing image nudged elastic band method for finding saddle points and minimum energy paths," J. Chem. Phys., 2000, 113, 9901-9904.
Herbst et al., "Relativistic calculations of 4f excitation energies in the rare-earth metals: Further results," Phys. Rev. B, 1978, 17, 3089.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Huijgen et al., "Carbon dioxide sequestration by mineral carbonation," ECN-C--03-016, www.ecn.nl/docs/library/report/200e/c03016.pdf, Feb. 2003.
Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).
Imanaka et al., "Advances in Direct NOx Decomposition Catalysts," Appl. Catal. A: Gen., 431-432, 2012, 1-8.
Ishida et al., "Evaluation of a Chemical-Looping-Combustion Power-Generation System by Graphic Exergy Analysis," Energy, 12(2), 147-154 (1987).
Iwamoto et al., "Influence of sulfur dioxide on catalytic removal of nitric oxide over copper ion-exchanged ZSM-5 Zeolite." Appl. Catal., 69(2), 1991, 15-19.
Izquierdo et al., "Catalyst Deactivation and Regeneration Processes in Biogas Tri-Reforming Process. The Effect of Hydrogen Sulfide Addition," Catalysts, 2018, 8(12): 19 pages.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of CoO—NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Modularization strategy for syngas generation in chemical ," AIChE Journal, 2017, 63(8):3343-3360.
Kathe et al., "Chemical Looping Gasification for Hydrogen Enhanced Syngas Production with in-situ CO2 Capture," United States Department of Energy, OSTI: 1185194, (2015).

(56) References Cited

OTHER PUBLICATIONS

Kiuchi et al., "Recovery of hydrogen from hydrogen sulfide with metals or metal sulfides," Int. J. Hydrogen Energy, 1982, 7: 477-482.

Koulialias et al., "Ordered defects in Fe 1- x S generate additional magnetic anisotropy symmetries," Journal of Applied Physics, 2018, 123(3): 033902, 10 pages.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a plane-wave basis set," Phys. Rev. B, 1996, 54, 11169.

Kumar et al., "Direct air capture of CO2 by physisorbent materials," Angew. Chem., Int. Ed., 2015, 54, 14372-14377.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.

Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.

Liu et al., "Recent Advances in Catalytic DeNOx Science and Technology," Catalysis Reviews, 48(1), 2006, 43-89.

Lockwood Greene, "Ironmaking Process Alternative Screening Study, vol. I: Summary Report," Department of Energy United States of America, Oct. 2000, 153 pages.

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et. al., "Ammonia decomposition catalysis using non-stoichiometric lithium imide," Chem. Sci., 2015, 6, 3805.

Mamman et al., "Simultaneous steam and CO2 reforming of methane to syngas over NiO/MgO/SA-5205 in presence and absence of oxygen," Applied Catalysis A, 1998, vol. 168, p. 33-46.

Mao et al., "Facile synthesis of phase-pure FeCr$_2$Se$_4$ and FeCr$_2$S$_4$ nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al., "Direct Decomposition of NO into N2 and O2 Over C-type Cubic Y2O3—Tb4O7—ZrO2," Materials Sciences and Applications, 3(10), 2012, 733-738.

Mattisson et al., "Application of chemical-looping combustion with capture of CO2," Second Nordic Minisymposium on Carbon Dioxide Capture and Storage, Goeteborg, Oct. 26, 2001, pp. 46-51.

Mattisson et al., "Chemical-looping combustion using syngas as fuel," International Journal of Greenhouse Gas control, 2007, vol. 1, Issue 2, pp. 158-169.

Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of CO2," Fuel, 2001, vol. 80, pp. 1953-1962.

Mattisson et al., "Use of Ores and Industrial Products as Oxygen Carriers in Chemical-Looping Combustion," Energy & Fuels, 2009, vol. 23, pp. 2307-2315.

Mihai et al., "Chemical looping methane partial oxidation: The effect of the crystal size and O content of LaFeO3," Journal of Catalysis, 2012, 293:175-185.

Miller et al., "Toward Transformational Carbon Capture," AIChE Journal, 62, 1-10 (2016).

Moreira, "Steam Cracking: Kinetics and Feed Characterization," Dissertation, 2015, 10 pages.

Netl, National Energy Technology Laboratory. U.S. Department of Energy, "Quality Guidelines for Energy System Studies—Specification for Selected Feedstocks." Jan. 2012.

Netl, National Energy Technology Laboratory. U.S. Department of Energy, "Syngas Contaminant Removal and Conditioning," webpage accessed on Jul. 8, 2018.

Nipattummakul et al., "Hydrogen and syngas production from sewage sludge via steam gasification," Fuel and Energy Abstracts, 2010, 35 (21), 11738-11745.

Ockwig et al., "Membranes for Hydrogen Separation," American Chemical Society, Chem. Rev., Oct. 10, 2007, vol. 107, pp. 4078-4110.

O'Connor et al., "Carbon Dioxide Sequestration by Direct Mineral Carbonation: Results from Recent Studies and Currents Status," Abstract, USDOE Office of Fossil Energy, 2001.

Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).

Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.

Osha, "Hydrogen Sulfide in Workplaces," <https://www.osha.gov/SLTC/hydrogensulfide/hydrogensulfide_found.html> webpage accessed Jul. 8, 2018.

Pans et al., "Optimization of H2 production with CO2 capture by steam reforming of methane integrated with a chemical-looping combustion system," International Journal of Hydrogen Energy, 2013, 38(27): 11878-11892.

Park et al., "CO2 Mineral Sequestration: Chemically Enhanced Aqueous Carbonation of Serpentine," The Canadian Journal of Chemical Engineering, 2003, vol. 81, pp. 885-890.

(56) References Cited

OTHER PUBLICATIONS

Park et al., "CO2 Mineral Sequestration: physically activated dissolution of serpentine and pH swing process," Chemical Engineering Science, 2004, vol. 59, pp. 5241-5247.
Perdew et al., "Generalized gradient approximation made simple," Phys. Rev. Lett., 1996, 77, 3865.
Pfeifer, "Industrial furnaces-status and research challenges," Energy Procedia, 2017, 120: 28-40.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Enhanced methane monversion in mhemical looping partial oxidation systems using a copper doping modification," Appl. Catal. B, 2018, 235, 143-149.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Rollmann et al., "First-principles calculation of the structure and magnetic phases of hematite," Phys. Rev. B, 2004, 69, 165107.
Rostrup-Nielsen, "Syngas in Perspective," Catalysis Today, 2002, 71(3-4), 243-247.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Ryden et al., "Using steam reforming to produce hydrogen with carbon dioxide capture by chemical-looping combustion," International Journal of Hydrogen Energy, 2006, 31(10): 1271-1283.
Sassi et al., "Sulfur Recovery from Acid Gas Using the Claus Process and High Temperature Air Combustion ( HiTAC ) Technology," Am. J. Environ. Sci., 2008, 4, 502-511.
Sattler et al., "Catalytic Dehydrogenation of Light Alkanes on Metals and Metal Oxides," Chem Rev, 2014, 114(20): 10613-10653.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sheppard et al., "Paths to which the nudged elastic band converges," J. Comput. Chem., 2011, 32, 1769-1771.
Shick et al., "Single crystal growth of $CoCr_2S_4$ and $FeCr_2S_4$," Journal of Crystal Growth, 1969, 5(4): 313-314.
Speight, "Gasification processes for syngas and hydrogen production," Gasification for Synthetic Fuel Production, Woodhead Publishing, 2015, 119-146.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Sun et al., "Review: Fundamentals and challenges of electrochemical CO2 reduction using two-dimensional materials," Chem, 2017, 3, 560-587.
Takanabe, "Catalytic Conversion of Methane: Carbon Dioxide Reforming and Oxidative Coupling," Journal of the Japan Petroleum Institute, 2012, 55, 1-12.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," pp. 34, Revised Jan. 8, 2002.
United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., "Highly efficient metal sulfide catalysts for selective dehydrogenation of isobutane to isobutene," ACS Catalysis, 2014, 4: 1139-1143.
Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.
Wang et al., "Study of bimetallic interactions and promoter effects of FeZn, FeMn and FeCr Fischer—Tropsch synthesis catalysts," Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Xu et al., "A novel chemical looping partial oxidation process for thermochemical conversion of biomass to syngas," Applied Energy, 2018, 222:119-131.
Yamazaki et al., "Development of highly stable nickel catalyst for methane-steam reaction under low steam to carbon ratio," Applied Catalyst A, 1996, vol. 136, p. 49-56.
Yin et al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Zeng et al., "Metal oxide redox chemistry for chemical looping processe," Nat Rev Chem., 2018, 2, 349-364.
International Search Report and Written Opinion for Application No. PCT/US2020/049105 dated Jan. 29, 2021 (22 pages).

\* cited by examiner

REDOX REACTION FACILITATED CARBON DIOXIDE CAPTURE FROM FLUE GAS AND CONVERSION TO CARBON MONOXIDE

CROSS-REFERENCE TO RELATED APPLICATION

The present application is a U.S. national stage entry of International Patent Application No. PCT/US2020/049105, filed on Sep. 3, 2020, which claims priority to U.S. Provisional Patent Application No. 62/895,109, filed on Sep. 3, 2019, the entire contents of each of which are fully incorporated herein by reference.

TECHNICAL FIELD

The present disclosure relates to chemical looping systems and methods. More particularly, exemplary chemical looping systems convert carbon dioxide in flue gas to carbon monoxide.

INTRODUCTION

Syngas is a mixture of hydrogen and carbon monoxide that is an important intermediate compound for fuel and chemical production. Several syngas production technologies exist which are both process and energy intensive. Steam reforming and dry reforming are endothermic reactions for syngas production with $CH_4$ as the hydrocarbon feedstock which utilize $H_2O$ and $CO_2$, respectively. The endothermic heat is provided by burning $CH_4$, which results in carbon emissions. Auto-thermal reforming is exothermic in nature but requires an energy intensive air separation unit. The energy consumption in the form of electricity also leads to carbon emissions. Syngas can also be generated using solid fuels such as coal, biomass etc. and liquid fuels such as residual oil etc. through gasification reactions. These processes also suffer from high energy requirements, ultimately driving the carbon footprint of such systems.

Similar to syngas, hydrogen is also an important chemical intermediate and is used for the production of value-added chemicals such as ammonia. Typically, hydrogen is produced by steam methane reforming along with a water gas shift reactor and an acid gas removal unit. Both the production of syngas and hydrogen requires several unit operations which lowers the overall efficiency and thus are required to rely on economies of scale for them to be economically viable.

SUMMARY

In one aspect, a method of operating a reactor system is disclosed. An exemplary method may include providing oxygen carrier particles to a first reactor, where the oxygen carrier particles comprise a support material and metal oxide; providing flue gas comprising carbon dioxide ($CO_2$) to the first reactor; operating the first reactor at a temperature of 300° C. to 700° C.; collecting a first reactor gas output comprising less than 1 ppb $CO_2$; providing the oxygen carrier particles to a second reactor; providing a hydrocarbon stream to the second reactor; operating the second reactor at a temperature of 500° C. to 1100° C.; collecting a second reactor gas output comprising hydrogen gas ($H_2$) and carbon monoxide (CO); providing the oxygen carrier particles to a third reactor; providing an oxidizing stream to the third reactor; and collecting a third reactor gas output comprising carbon monoxide (CO).

In another aspect, a reactor system is disclosed. An exemplary reactor system may include a first reactor, a second reactor in fluid communication with the first reactor, and a third reactor in fluid communication with the second reactor. The first reactor may comprise oxygen carrier particles comprising a support material and metal oxide, a flue gas inlet in fluid communication with a flue gas source, the flue gas source providing flue gas comprising carbon dioxide ($CO_2$) to the first reactor; and a first reactor gas outlet configured to provide outlet gas comprising less than 1 ppb $CO_2$. The second reactor may comprise a hydrocarbon stream input in fluid communication with a hydrocarbon source, the hydrocarbon source configured to provide coal, biomass, natural gas, shale gas, biogas, or petroleum coke to the second reactor; and a second reactor gas outlet configured to provide a second reactor gas output comprising hydrogen gas ($H_2$) and carbon monoxide (CO). The third reactor may comprise an oxidizing stream inlet in fluid communication with an oxidizing gas source comprising one or more of: steam ($H_2O$), carbon dioxide ($CO_2$); and a third reactor outlet gas outlet configured to provide a third reactor gas output comprising carbon monoxide (CO).

In another aspect, a method of operating a reactor system is disclosed. An exemplary method may include providing oxygen carrier particles to a first reactor, the oxygen carrier particles comprising a support material and metal oxide; providing flue gas comprising carbon dioxide ($CO_2$) to the first reactor; operating the first reactor at a temperature of 300° C. to 700° C.; collecting a first reactor gas output comprising less than 1 ppb $CO_2$; providing the oxygen carrier particles to a second reactor; providing a hydrocarbon stream to the second reactor; providing an oxidizing stream to the second reactor such that the oxidizing stream is counter-current to the oxygen carrier particles; operating the second reactor at a temperature of 720° C. to 1100° C.; and collecting a second reactor gas output comprising hydrogen gas ($H_2$) and carbon monoxide (CO).

There is no specific requirement that a material, technique or method relating to chemical looping carbon dioxide capture include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
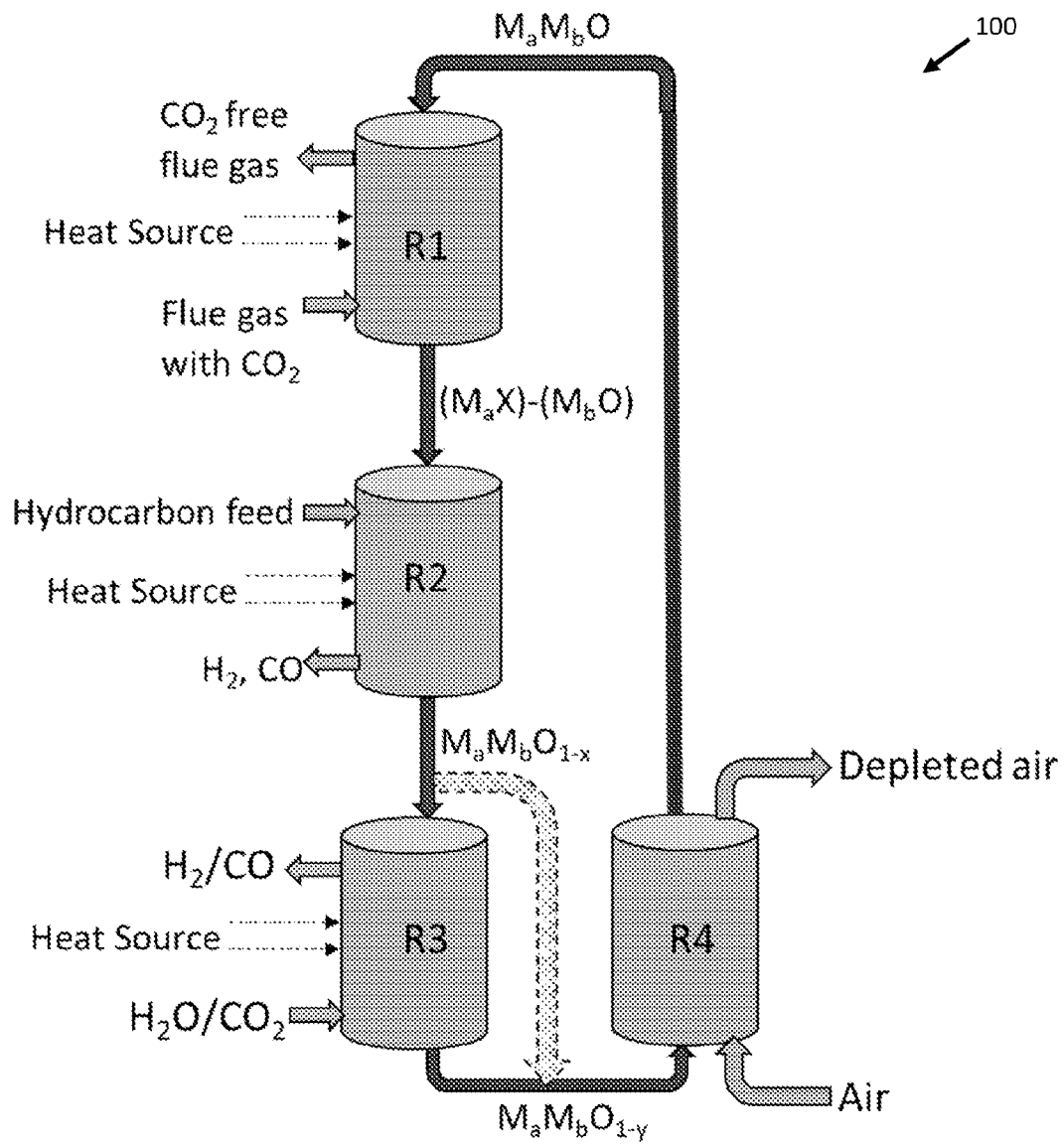
FIG. 1 is a schematic diagram of an example embodiment of a reactor system.

The instant disclosure provides various designs and operating strategies for harnessing fossil fuel energy through chemical looping. Syngas and hydrogen are important intermediate compounds for the fuel and chemical production industries. Current technologies for the conversion of various hydrocarbon sources to syngas or hydrogen require several energy intensive units. The energy is utilized in the form of electricity or heat, both being derived from burning fossil fuels. This leads to an increase in the carbon emissions per mole of syngas/hydrogen produced.

Exemplary systems and methods disclosed herein can generate products such as syngas, hydrogen, or electricity, while capturing $CO_2$ from flue gas streams and integrating the captured $CO_2$ into the system. Exemplary operating strategies may involve capturing $CO_2$ using metal oxide oxygen carriers leading to the formation of metal carbonate-oxide mixtures, which may be further used to partially oxidize hydrocarbon feedstock for syngas production. Reduced oxygen carriers may be regenerated completely or partially with oxidants such as steam, $CO_2$, or air to complete a loop.

Exemplary systems and methods disclosed herein may mitigate carbon emissions through process intensification and flexibility towards different hydrocarbon feedstock and heat sources. $CO_2$ may be captured from flue gas and converted simultaneously to CO in the same process, because this conversion may be facilitated by the redox reaction for syngas or hydrogen production.

In exemplary chemical looping systems, carbonate decomposition may be facilitated by syngas production, which can enable a reduction of the operating temperature of the calcination reaction and improve the thermal efficiency of $CO_2$ capture and utilization. Various configurations described herein may efficiently utilize the thermodynamic potential of the oxygen carrier material.

I. Exemplary Oxygen Carrier Particles

Broadly, exemplary systems and methods utilize oxygen carrier particles. Exemplary oxygen carrier particles are capable of undergoing reduction/oxidation reactions that change the oxidation state of one or more species, or reactions that change the solid phase of one or more species. Exemplary oxygen carrier particles may be metal oxides, metal carbonates, metal alloys, or combinations thereof. Certain design considerations for exemplary oxygen carrier particles can include reactivity, recyclability and mechanical strength, along with oxygen/$CO_2$ carrying capacity.

Exemplary metal oxide composites may have at least one of the active metals as iron. Exemplary mixed metal composites can be one single phase or can be a mixture of several active phases. The composite can comprise more than one active metal capable of a change in oxidation state under reducing or oxidizing environments, or that undergoes phase change under a partial pressure of $CO_2$.

Other transition metal oxides such as nickel oxide, copper oxide, cobalt oxide, and manganese oxide can be an active metal oxide in conjunction with iron. Nickel oxide, copper oxide, and other transition metal oxides appear to be particularly suited because of their high oxygen carrying capacity and good reactivity among all the transition metal oxide candidates. Group I and II metal oxides such as MgO, CaO, $Na_2O$ etc. can also be considered as active metals/metal oxides because of their high affinity towards $CO_2$ through carbonate formation.

The recyclability of exemplary oxygen carriers can be promoted by adding supportive oxides, also termed support materials, which may also affect the lattice oxygen ion diffusivity. The support material can be any support material known and used in the art. Non-limiting examples of support materials include, but are not limited to, silica, magnesia, alumina, ceria, titania, zirconia, or a combination comprising two or more of the aforementioned supports such as $MgAl_2O_4$. The amount of support material can be 20% to 80% by weight (wt %) of the oxygen carrier. In various implementations, exemplary oxygen carriers may comprise 20 wt %, 30 wt % 40 wt %, 50 wt %, 60 wt %, 70 wt %, 80 wt % or any value therebetween.

Inert carbonate materials such as $K_2CO_3$ can also be included as a part of the overall composite solid which can later combine with the carbonate phase to form a mixed metal carbonate.

In some implementations, metal oxide reactivity can be enhanced by low concentration dopant modification. One or more dopants may comprise 0 wt % to about 5 wt % of the oxygen carrier particles. In various instances, oxygen carrier particles may comprise 0 wt % to 5 wt %; 1 wt % to 5 wt %; 2 wt % to 5 wt %; 3 wt % to 5 wt %; 1 wt % to 4 wt %; 1 wt % to 3 wt %; 1 wt % to 2 wt %; 2 wt % to 3 wt %; 3 wt % to 4 wt %; or 4 wt % to 5 wt % dopant.

Exemplary dopants can have one or more of the following impacts in reactivity enhancement of cyclic chemical looping redox reactions. Exemplary catalytic dopants can provide extra reaction sites during $CO_2$ capture and hydrocarbon conversion in addition to the host transition metal oxides such as iron oxide. The nature of aliovalent dopants, such as $Cu^{2+}$, $Co^{2+}$, $Ni^{2+}$ vs $Fe^{3+}$, may result in an increase of oxygen vacancies, which may promote oxygen ion transport in methane partial oxidation and improves the syngas quality. Exemplary catalytic dopants can lower reaction energy barrier of $CO_2$ capture and C—H activation with the host transition metal oxide materials. Example catalytic transition metal dopants include, but are not limited to, Ni, Co, Cu, Sc, Ti, V, Cr, Mn, Zn, Y, Zr, Nb, Mo, Tc, Ru, Rh, Pd, Ag, Cd, Lu, Hf, Ta, W, Re, Os, Ir, Pt, and Au.

II. Exemplary Reactor System Arrangements

Broadly, exemplary reactor systems disclosed herein convert hydrocarbon feed and an external source of energy into syngas, hydrogen, or both. Additionally, exemplary reactor systems may capture carbon dioxide ($CO_2$), which may be facilitated by redox reactions in system reactors.

FIG. 1 is a schematic diagram of example reactor system 100 that includes a first reactor (R1), a second reactor (R2), a third reactor (R3), and an optional fourth reactor (R4). Generally, reactor system 100 is a multi-reactor chemical looping system that can simultaneously generate syngas, hydrogen and treat flue gas for $CO_2$ removal. Each reactor in exemplary reactor system 100 can be operated independently at pressures ranging from 1 atm to 50 atm, depending on desired feed/product parameters. The individual reactors can be modified/removed as long as the oxygen carrier particles return to the original solid phase to complete the loop.

First reactor (R1) can include a plurality of oxygen carrier particles that comprise a support material and metal oxide. First reactor (R1) can also include a flue gas inlet in fluid communication with a flue gas source. In some instances, a flue gas source may provide flue gas comprising carbon dioxide ($CO_2$) to the first reactor. First reactor (R1) can include a first reactor gas outlet configured to provide outlet gas. First reactor (R1) is also provided with heat from a heat source.

Example composite oxygen carrier particles depicted by $M_aM_bO$ function as an oxygen carrier and a $CO_2$ carrier. In FIG. 1, $M_a$ and $M_b$ represent active metal components that can either undergo redox reactions with the gas phase or can undergo a phase transformation into a different solid phase. The composite metal oxide oxygen carrier is not limited two active metals and additional details on the metal oxide characteristics are discussed in greater detail above.

Example composite oxygen carriers react with $CO_2$ from flue gas in reactor R1 under moderate temperature (such as 300° C.-700° C.) and can be converted to $(M_aX)$-$(M_bO)$, where $M_aX$ is metal carbonate phase and MbO is metal oxide phase of the oxygen carrier. Conversion of $M_aM_bO$ to $(M_aX)$-$(M_bO)$ ensures $CO_2$ capture in the form of metal carbonate, thus making flue gas $CO_2$ free. The gas-solid hydrodynamics in reactor R1 can be in the form of a moving bed, entrained bed or fluidized bed configurations.

Second reactor (R2) is in fluid communication with first reactor (R1) and third reactor (R3). Second reactor (R2) can include a hydrocarbon stream input in fluid communication with a hydrocarbon source and a second reactor gas outlet configured to provide a second reactor gas output. Second reactor (R2) is also provided with heat from a heat source.

$(M_aX)$-$(M_bO)$ metal carbonate-oxide composite may be provided from first reactor (R1) to second reactor (R2) along with a hydrocarbon source such as coal, biomass, petroleum coke, residual oil, shale gas, natural gas, etc. Second reactor (R2) may be operated at high temperatures (800° C.-1100° C.) under co-current/countercurrent gas-solid flow in either a moving bed/entrained bed configuration or a combination of both.

The configuration of second reactor (R2) can be tuned to maximize the thermodynamic potential of the gas-solid reactions to produce syngas, and additional examples are discussed below with reference to FIG. 2-FIG. 5. At the high temperatures in second reactor (R2), $M_aX$ may decompose to release $CO_2$ and form $M_aM_bO$. The $CO_2$ released in this step may gasify/reform the hydrocarbon feed and produce CO. $M_aM_bO$ may also react with the hydrocarbon feed and produce a H2/CO mixture, commonly known as syngas. To adjust an $H_2$:CO ratio, steam, methane, and/or carbon dioxide ($CO_2$) can be co-injected along with the feed.

Third reactor (R3) is in fluid communication with second reactor (R2) and either fourth reactor (R4) or, in implementations without a fourth reactor, the first reactor (R1). Third reactor (R3) can include an oxidizing stream inlet in fluid communication with an oxidizing gas source and a third reactor gas outlet configured to provide a third reactor gas output. Second reactor (R2) is also provided with heat from a heat source.

Reduced metal oxide oxygen carrier $M_a$-$M_bO_{1-x}$ may be provided from the second reactor (R2) to the third reactor (R3). In the third reactor (R3), reduced metal oxide oxygen carrier particles may react with $H_2O$/$CO_2$ to produce $H_2$/CO and become oxidized to $M_aM_bO_{1-y}$ (where x>y). The third reactor (R3) may be operated at a moderate reaction temperature (400° C.-900° C.).

Optional fourth reactor (R4) is in fluid communication with the third reactor (R3) and the first reactor (R1). The fourth reactor (R4) can include an air stream inlet and a depleted air outlet. Solids may be mechanically or pneumatically conveyed from the fourth reactor (R4) to the first reactor (R1).

Partially oxidized oxygen carrier particles may be provided from third reactor (R3) to the fourth reactor (R4). In the fourth reactor (R4), the oxygen carrier particles may be completely oxidized using air and then provided to the first reactor (R1) to complete the loop. Operating temperatures of the fourth reactor (R4) may be 500° C.-1100° C. In some instances, the fourth reactor (R4) can be coupled with an in-bed heat exchanger to extract any additional heat generated. The solids from R4 to R1 can be mechanically or pneumatically conveyed.

In some implementations, a solids stream coming out of the second reactor (R2) can be split into two streams: where one stream goes to the third reactor (R3) and the other stream bypasses the third reactor (R3) to go directly to the fourth reactor (R4). The split ratio can be adjusted based on process requirements of the overall system.

As shown in FIG. 1, first reactor (R1), second reactor (R2), and third reactor (R3) can be integrated independently with an external source of heat. Exemplary heat sources can be provided from carbon containing sources by burning hydrocarbon fuels or through low-carbon or no-carbon sources. These low or no carbon sources may include, but are not limited to, solar energy, geothermal energy, nuclear energy, hydrogen combustion, and microwave heating. Reactions in the fourth reactor (R4) may be highly exothermic and, accordingly, the fourth reactor (R4) typically does not require an external heating source.

The heat provided to the reactors can be through direct systems, indirect systems, or combinations of the two systems, and can heat the metal oxide/metal carbonate solids or the gas phase. Direct systems can include traditional systems such as in-bed combustion of fuels. Advanced systems can include concentrated solar power, direct microwave radiation, and chemical looping combustion systems.

Exemplary indirect heat systems may have a heat transfer medium between the source of the heat and the reactors in the chemical looping configuration. This heat transfer medium can be in a liquid phase, gas phase, or both phases. Traditional methods of employing a furnace box that surrounds the reactors can be used to provide radiative and convective heat to the reactors. Advanced methods of having in-bed heat exchangers such as moving bed or fluidized bed heat exchangers can be used to provide the heat to the reactors. In all configurations, a goal is to mitigate the overall carbon emissions using in-process carbon capture techniques in the first reactor (R1), and/or through using advanced heat generation systems such as chemical looping combustion or the use of renewable sources of heat.

For illustrative purposes only, and without limitation, the following are example reactions in each of the four reactors shown in FIG. 1. The exemplary reactions have oxygen carrier particles comprising $Ca_2Fe_2O_5$+$Fe_2O_3$.

First Reactor (R1): $Ca_2Fe_2O_5 + 2CO_2 \rightarrow 2CaCO_3 + Fe_2O_3$

Figure 2:
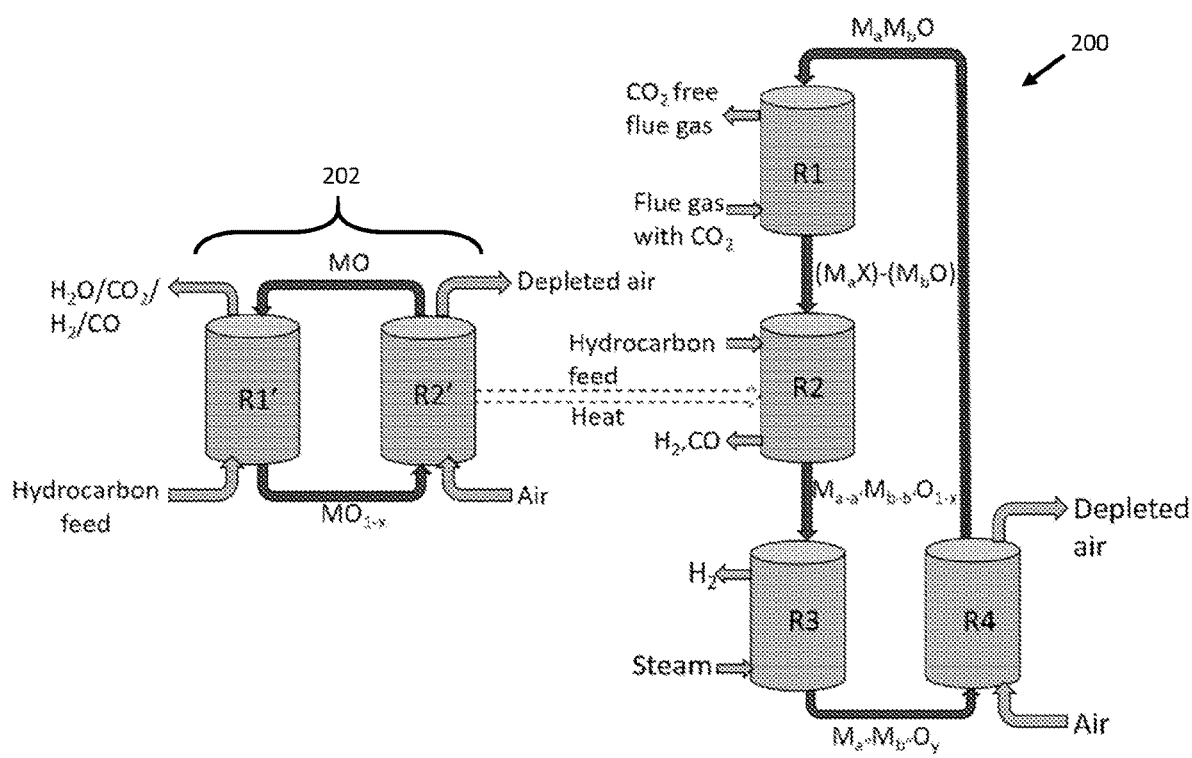
FIG. 2 is a schematic diagram of another example embodiment of a reactor system.

Second Reactor (R2): $CaCO_3 \rightarrow CaO + CO_2$ $2CaO + Fe_2O_3 \rightarrow Ca_2Fe_2O_5$ $C + CO_2 \rightarrow 2CO$ $Ca_2Fe_2O_5 + H/C \rightarrow CaO + Fe + H_2 + CO$ Third Reactor (R3): $2CaO+2Fe+3H_2O \rightarrow Ca_2Fe_2O_5+3H_2$
$3Fe+4H_2O \rightarrow Fe_3O_4+4H_2$
Fourth Reactor (R4): $Ca_2Fe_2O_5+2Fe_3O_4+0.5 O_2(air) \rightarrow Ca_2Fe_2O_5+3Fe_2O_3$ FIG. 2 is a schematic diagram of example reactor system 200. Reactor system 200 includes components shown in reactor system 100 as well as fifth reactor (R1') and sixth reactor (R2').

In reactor system 200, heat needed to carry out reactions in second reactor (R2) is provided by another chemical looping unit 202, which comprises fifth reactor (R1') and sixth reactor (R2'). Hydrocarbon feed such as coal, biomass, petcoke, shale gas, natural gas, etc. may be fed into fifth reactor (R1'), where the hydrocarbon feed may be reacted with fully oxidized metal oxide oxygen carriers to produce either full or partial combustion products.

Reduced oxygen carrier particles may be sent to the sixth reactor (R2') where they may be regenerated using air. The regeneration reaction is exothermic and generates heat, which is used to operate chemical looping system 202 under auto-thermal conditions. Excess heat produced in sixth reactor (R2') is used to raise the temperature inside the second reactor (R2). The chemical looping heat source 202 in reactor system 200 avoids the use of an energy intensive air separation unit and separates the $CO_2/CO$ for either sequestration or use as a feedstock. This configuration not only captures $CO_2$ from flue gas, but also captures $CO_2$ that may be emitted from the heat generation process.

Figure 3:
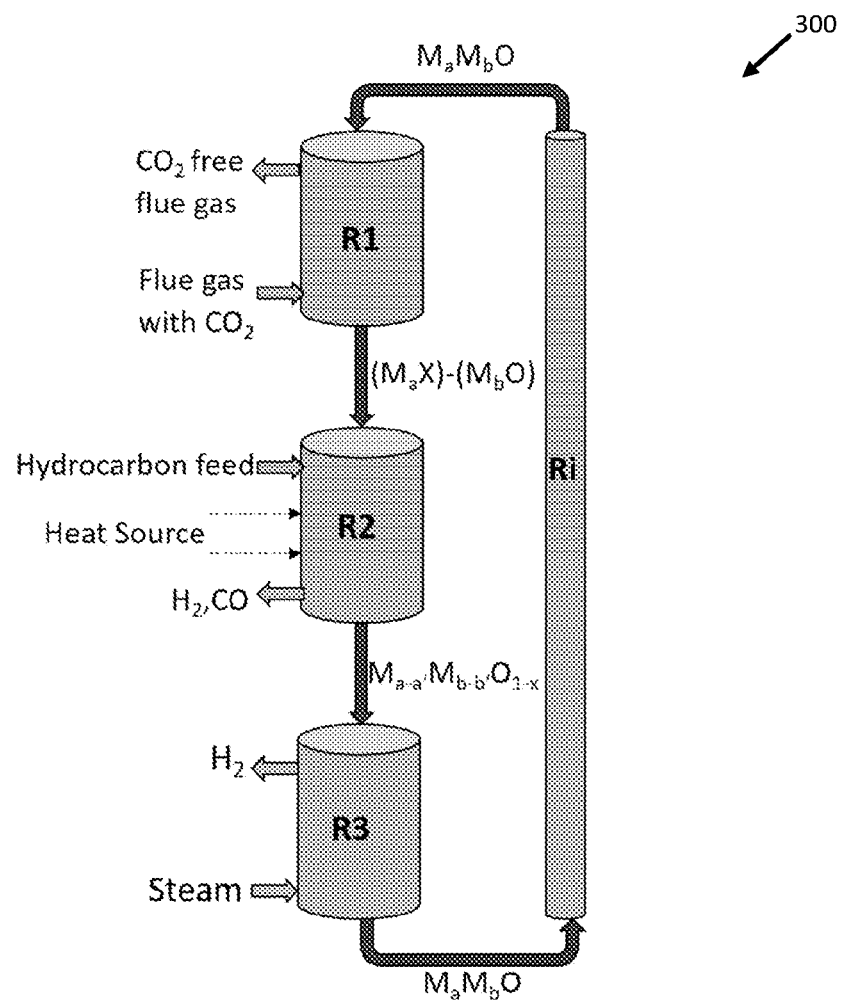
FIG. 3 is a schematic diagram of another example embodiment of a reactor system.

FIG. 3 is a schematic diagram of example reactor system 300 that includes first reactor (R1), second reactor (R2), third reactor (R3), and riser (Ri). The first reactor (R1) is in fluid communication with the second reactor (R2), the second reactor (R2) is in fluid communication with the first reactor (R1) and the third reactor (R3), the third reactor (R3) is in fluid communication with the second reactor (R2) and the riser (Ri), and the riser (Ri) is in fluid communication with the third reactor (R3) and the first reactor (R1).

First reactor (R1) and second reactor (R2) are configured as described above with reference to reactor system 100. Reactor system 300 differs from reactor system 100 in that the fourth reactor (R4) is removed in reactor system 300.

Reactor system 300 is configured such that partially oxidized composite metal oxide oxygen carrier particle $M_aM_bO_{1-x}$ that enters third reactor (R3) is completely oxidized to its original oxidation state i.e. $M_aM_bO$. Solids can be mechanically or pneumatically conveyed from third reactor (R3) to first reactor (R1).

Figure 4:
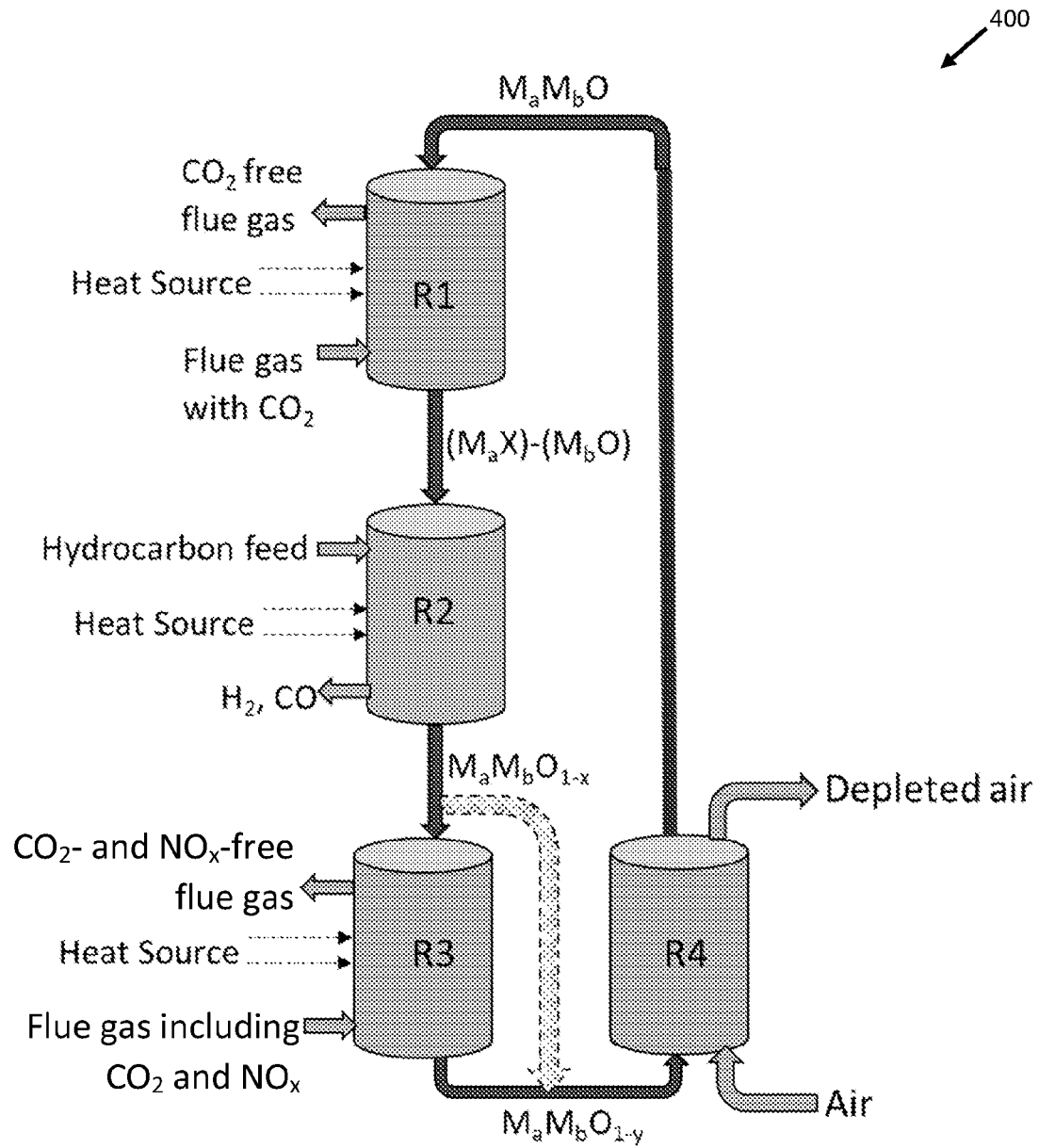
FIG. 4 is a schematic diagram of another example embodiment of a reactor system.

For illustration purposes only, an example is provided where dicalcium ferrite ($Ca_2Fe_2O_5$) is the composite metal oxide oxygen carrier in reactor system 300. In that example, the following reactions may occur.
First Reactor (R1): $Ca_2Fe_2O_5+2CO_2 \rightarrow 2CaCO_3+Fe_2O_3$
Second Reactor (R2): $CaCO_3 \rightarrow CaO+CO_2$ $2CaO+Fe_2O_3 \rightarrow Ca_2Fe_2O_5$ $C+CO_2 \rightarrow 2CO$ $Ca_2Fe_2O_5+H/C \rightarrow CaO+Fe+H_2+CO$
Third Reactor (R3): $2CaO+2Fe+3H_2O \rightarrow Ca_2Fe_2O_5+3H_2$ FIG. 4 is a schematic diagram of example reactor system 400 that includes a modified configuration for the third reactor (R3). Otherwise, reactor system 400 can include the same or similar components shown in reactor system 100. In reactor system 400, flue gas containing $NO_x$ and $CO_2$ may be used to oxidize reduced composite metal oxide particles instead of steam in third reactor (R3). The first reactor (R1), second reactor (R2), and fourth reactor (R4) may operate as described above with reference to reactor system 100.

In reactor system 400, third reactor (R3) can produce $N_2$ and CO from the flue gas stream. In some instances, steam can be injected along with flue gas to obtain $N_2$-containing syngas to increase the overall syngas yield of the process.

Figure 5:
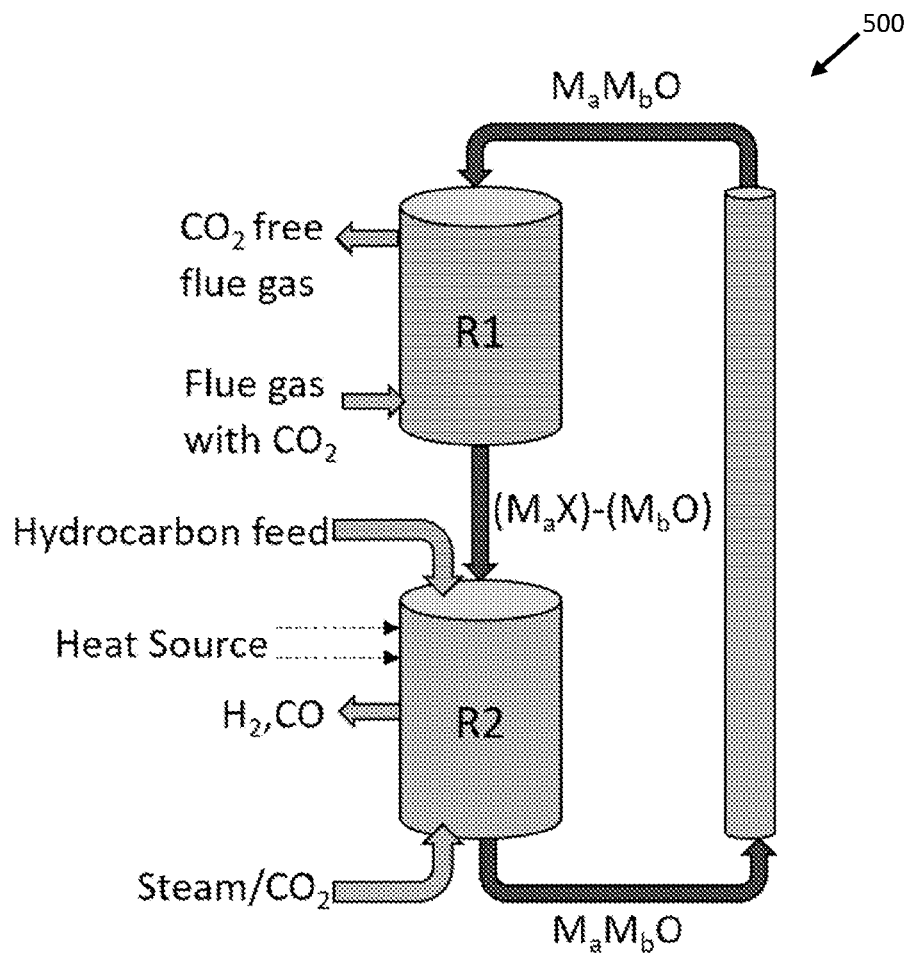
FIG. 5 is a schematic diagram of another example embodiment of a reactor system.

For illustration purposes only, and without limitation, an example is provided where dicalcium ferrite is the composite metal oxide oxygen carrier reactor system 400. In that example, the following reactions may occur the second reactor (R2) and third reactor (R3).
Second Reactor (R2): $CH_4+Ca_2Fe_2O_5 \rightarrow 2CaO+2Fe+3CO+6H_2$
Third Reactor (R3): $2CaO+2Fe+3CO_2 \rightarrow Ca_2Fe_2O_5+3CO$
$8CaO+8Fe+6NO_2 \rightarrow 4Ca_2Fe_2O_5+3N_2$ FIG. 5 is a schematic diagram of example reactor system 500 that includes first reactor (R1) and second reactor (R2). The first reactor (R1) may operate as described above with reference to reactor system 100.

In reactor system 500, the second reactor (R2) may have a cross-current moving bed configuration. The first reactor (R1) functions as the $CO_2$ capture reactor, similar to reactor system 100. In the second reactor (R2), carbon source(s) such as coal, biomass, petcoke, and methane ($CH_4$) may devolatilize upon entering the heated reactor and react with the metal oxide-metal carbonate. In the first half of the second reactor (R2), the volatiles may move downwards with oxygen carrier particles in a concurrent fashion, where oxygen carrier particles partially oxidize the volatiles to form $H_2/CO$. Char/tar formed upon decomposition of solid fuels may react with steam/$CO_2$, which may be fed into the second reactor (R2) at, or near, the bottom in a counter-current manner with respect to flow of the oxygen carrier particles.

Oxidants such as steam and $CO_2$ can gasify the carbon present in char/tar and generate more syngas, thus increasing the overall yield of syngas production. A top portion of the moving bed second reactor (R2) may behave as a co-current moving bed, whereas the bottom portion may operate in a counter-current fashion with the outlet syngas coming out of the middle. Examplary oxidants may also react with reduced oxygen carrier particles and regenerate the particles completely. Regenerated oxygen carrier particles may be then circulated back to the first reactor (R1) to complete the loop.

For illustration purposes only, an example is provided where dicalcium ferrite ($Ca_2Fe_2O_5$) is the composite metal oxide oxygen carrier reactor system 500. In that example, the following reactions may occur:
First Reactor (R1): $Ca_2Fe_2O_5+2CO_2 \rightarrow 2CaCO_3+Fe_2O_3$
Second Reactor (R2): $CaCO_3 \rightarrow CaO+CO_2$ $2CaO+Fe_2O_3 \rightarrow Ca_2Fe_2O_5$ $C+CO_2 \rightarrow 2CO$ $Ca_2Fe_2O_5+H/C \rightarrow CaO+Fe+H_2+CO$ $2CaO+2Fe+3H_2O \rightarrow Ca_2Fe_2O_5+3H_2$ III. Exemplary Methods of Operation Exemplary reactor systems described above may be operated in various ways.

An example method may include providing oxygen carrier particles to a first reactor. The oxygen carrier particles typically comprise a support material and metal oxide. Various aspects of exemplary oxygen carrier particles are described above. In some instances, the metal oxide may be an oxide of calcium (Ca), iron (Fe), nickel (Ni), copper (Cu), manganese (Mn), cobalt (Co), magnesium (Mg), sodium (Na), potassium (K), lithium (Li), strontium (Sr), or barium (Ba). In some instances, the support material may comprise silica ($SiO_2$), magnesia (MgO), alumina ($Al_2O_3$), ceria ($CeO_2$), Titania ($TiO_2$), zirconia ($ZrO_2$), or combinations thereof. In some instances, the oxygen carrier particles may comprise 20 weight percent (wt %) to 80 wt % support material.

The example method also includes providing flue gas to the first reactor, where the flue gas comprises carbon dioxide ($CO_2$). In various implementations, the first reactor may be arranged as a co-current moving bed, a counter-current moving bed, a fixed bed, or a fluidized bed.

Typically, a metal oxide-metal carbonate solid-phase mixture can be formed when the oxygen carrier particles contact the flue gas. In some instances, the metal oxide-metal carbonate solid-phase mixture includes one or more carbonates of calcium (Ca), magnesium (Mg), sodium (Na), potassium (K), lithium (Li), strontium (Sr), or barium (Ba).

The first reactor may be operated at a temperature of about 300° C. to about 700° C. In various implementations, the first reactor may be operated at a temperature of 300° C. to 700° C.; 300° C. to 500° C.; 500° C. to 700° C.; 400° C. to 700° C.; 300° C. to 600° C.; 400° C. to 660° C.; 300° C. to 400° C.; 400° C. to 500° C.; 500° C. to 600° C.; or 600° C. to 700° C.

The first reactor may be operated at a pressure of about 1 atm to about 50 atm. In various implementations, the first reactor may be operated at a pressure of 1 atm to 50 atm; 1 atm to 25 atm; 25 atm to 50 atm; 1 atm to 10 atm; 10 atm to 20 atm; 20 atm to 30 atm; 30 atm to 40 atm; 40 atm to 50 atm; 1 atm to 5 atm; 1 atm to 3 atm; 3 atm to 6 atm; or 6 atm to 10 atm.

The example method may also include collecting a first reactor gas output. The first reactor gas output is free of, or nearly free of, carbon dioxide ($CO_2$). A carbon dioxide concentration in the first reactor gas output may vary depending on parameters such as oxygen carrier particle flow rate and reactor temperature. In various instances, the first reactor gas output may comprise less than 1 ppm; less than 100 ppb; less than 10 ppb; or less than 1 ppb carbon dioxide ($CO_2$).

Next, the oxygen carrier particles can be provided from the first reactor to the second reactor. A hydrocarbon stream may also be provided to the second reactor. In various implementations, the second reactor may be arranged as a co-current moving bed, a counter-current moving bed, a fixed bed, or a fluidized bed.

The hydrocarbon stream may include coal, biomass, natural gas, shale gas, biogas, petroleum coke, or combinations thereof. In some implementations, steam and/or carbon dioxide ($CO_2$) can be co-injected with the hydrocarbon stream. In some instances, co-injecting steam and/or carbon dioxide ($CO_2$) may enhance syngas quality and/or enable manipulation of the $H_2$: CO ratio in the second reactor.

The second reactor may be operated at a temperature of about 500° C. to 1100° C. In various implementations, the second reactor may be operated at a temperature of 500° C. to 1100° C.; 500° C. to 800° C.; 600° C. to 1000° C.; 700° C. to 1100° C.; 720° to 910° C.; 910° C. to 1100° C.; 720° C. to 1000° C.; 800° C. to 1100° C.; 500° C. to 600° C.; 600° C. to 700° C.; 700° C. to 800° C.; 800° C. to 900° C.; 900° C. to 1000° C.; or 1000° C. to 1100° C.

The second reactor may be operated at a pressure of about 1 atm to about 50 atm. In various implementations, the second reactor may be operated at a pressure of 1 atm to 50 atm; 1 atm to 25 atm; 25 atm to 50 atm; 1 atm to 10 atm; 10 atm to 20 atm; 20 atm to 30 atm; 30 atm to 40 atm; 40 atm to 50 atm; 1 atm to 5 atm; 1 atm to 3 atm; 3 atm to 6 atm; or 6 atm to 10 atm.

The example method may also include collecting a second reactor gas output. In some instances, the second reactor gas output comprises hydrogen gas ($H_2$) and carbon monoxide (CO).

The example method may also include providing the oxygen carrier particles to a third reactor from the second reactor. An oxidizing stream may also be provided to the third reactor and a third reactor gas output may be collected. Then, the oxygen carrier particles may be provided from the third reactor to the first reactor or to a fourth reactor. In some implementations, the oxygen carrier particles are provided from the third reactor to a riser, and then the oxygen carrier particles are provided from the riser to the first reactor.

In some implementations, the oxidizing stream may comprise steam ($H_2O$) and carbon dioxide ($CO_2$) and the third reactor gas output may comprise carbon monoxide (CO), hydrogen gas ($H_2$). In some implementations, the oxidizing stream may comprise steam ($H_2O$), carbon dioxide ($CO_2$), and air, and the third reactor gas output may comprise carbon monoxide (CO), hydrogen gas ($H_2$) and depleted air (lean $O_2$). In some implementations, the oxidizing stream may comprise an oxide of nitrogen ($NO_x$ and carbon dioxide ($CO_2$), and the third reactor gas output may comprise carbon monoxide (CO) and nitrogen ($N_2$).

The example method may also include, in some implementations, providing the oxygen carrier particles to a fourth reactor and providing an air stream to the fourth reactor. A fourth reactor gas output may be collected that comprises depleted air. Then the oxygen carrier particles may be provided to the first reactor.

In some instances, the example method may include operating a second reactor system. In those implementations, the example method may include providing second oxygen carrier particles and a second hydrocarbon stream to a fifth reactor. The second oxygen carrier particles may have some of all of the characteristics described above with reference to oxygen carrier particles.

A fifth reactor gas output may be collected that comprises a mixture of hydrogen gas ($H_2$), steam ($H_2O$), carbon monoxide (CO), and/or carbon dioxide ($CO_2$). In some instances, the fifth reactor gas output may comprise a mixture of carbon dioxide ($CO_2$) and steam ($H_2O$).

The second oxygen carrier particles may be provided from the fifth reactor to the sixth reactor. Air may also be provided to the sixth reactor, and a sixth reactor gas output may be collected that comprises depleted air. Then heat generated in the sixth reactor may be provided to the second reactor.

IV. Experimental Examples

Experimental examples were conducted to validate the use of $Ca_2Fe_2O_5$ or similar types of metal oxide-based oxygen carriers in chemical looping systems. Performance of this oxygen carrier was evaluated through use of thermogravimetric analysis (TGA) and fixed bed experiments. Two samples were used for analysis: unsupported $Ca_2Fe_2O_5$ and 40% MgO supported (by wt.) $Ca_2Fe_2O_5$.

A. Experimental Thermogravimetric Analysis

Figures 6A, 6B:
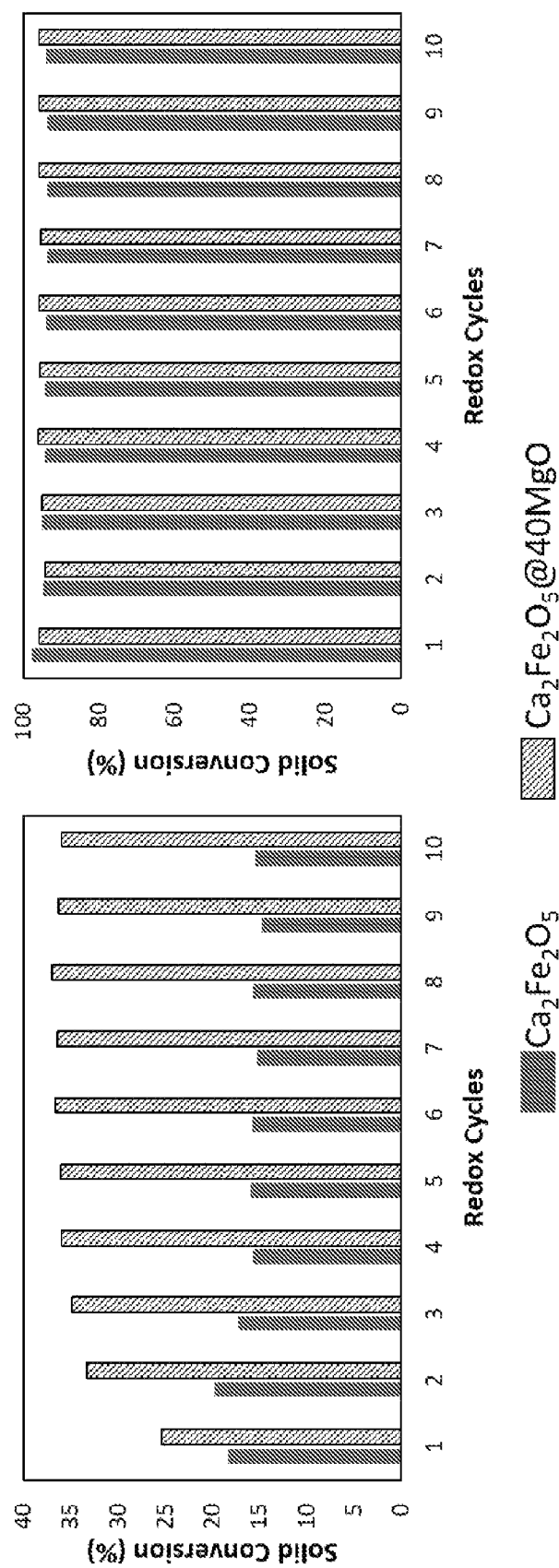
FIG. 6A shows experimental thermogravimetric analysis of solid conversion trends across 10 redox cycles for $Ca_2Fe_2O_5$ particles reacted with methane ($CH_4$).
FIG. 6B shows experimental thermogravimetric analysis of regeneration of reduced $Ca_2Fe_2O_5$ particles using carbon dioxide ($CO_2$).

FIG. 6A and FIG. 6B show solid conversion obtained during 10 cyclic reduction and oxidation steps at 1000° C. and 1 atm. The reduction of the metal oxide was carried out in $CH_4$ (20% by vol. with total flowrate of 200 ml/min) and the oxidation of the metal oxide was carried out in $CO_2$. A Setaram SETSYS TGA was used to analyze the weight change data. About 30-35 mg sample was loaded into an alumina crucible suspended from the mechanical balance of TGA. Helium (He) was used as a protective gas to prevent $CH_4$ seepage into the balance. Low sample loading and high gas flows ensured no mass transfer limitation during the experiment. Sample regeneration was carried out by sending 50% $CO_2$ by volume with a total flow of 200 ml/min, balance with $N_2$. Here, the solid conversion is defined as the amount of active lattice oxygen donated. Accordingly, the solid phase $Ca_2Fe_2O_5$ will have a solid conversion of 0% and CaO—Fe will have a solid conversion of 100%.

Solid conversion during reduction initially increased and then dropped for unsupported $Ca_2Fe_2O_5$ sample. On the other hand, solid conversion increased and maintained its activity across multiple redox cycles for 40% MgO supported $Ca_2Fe_2O_5$ sample. For both the samples, >95% solid conversion is obtained. Similar performance is expected if $CO_2$ is replaced using steam due to similar thermodynamic behavior of steam and $CO_2$ in the presence of $Ca_2Fe_2O_5$. The support MgO provides sintering resistance towards the redox reactions of $Ca_2Fe_2O_5$, thus improving its recyclability.

Figure 7:
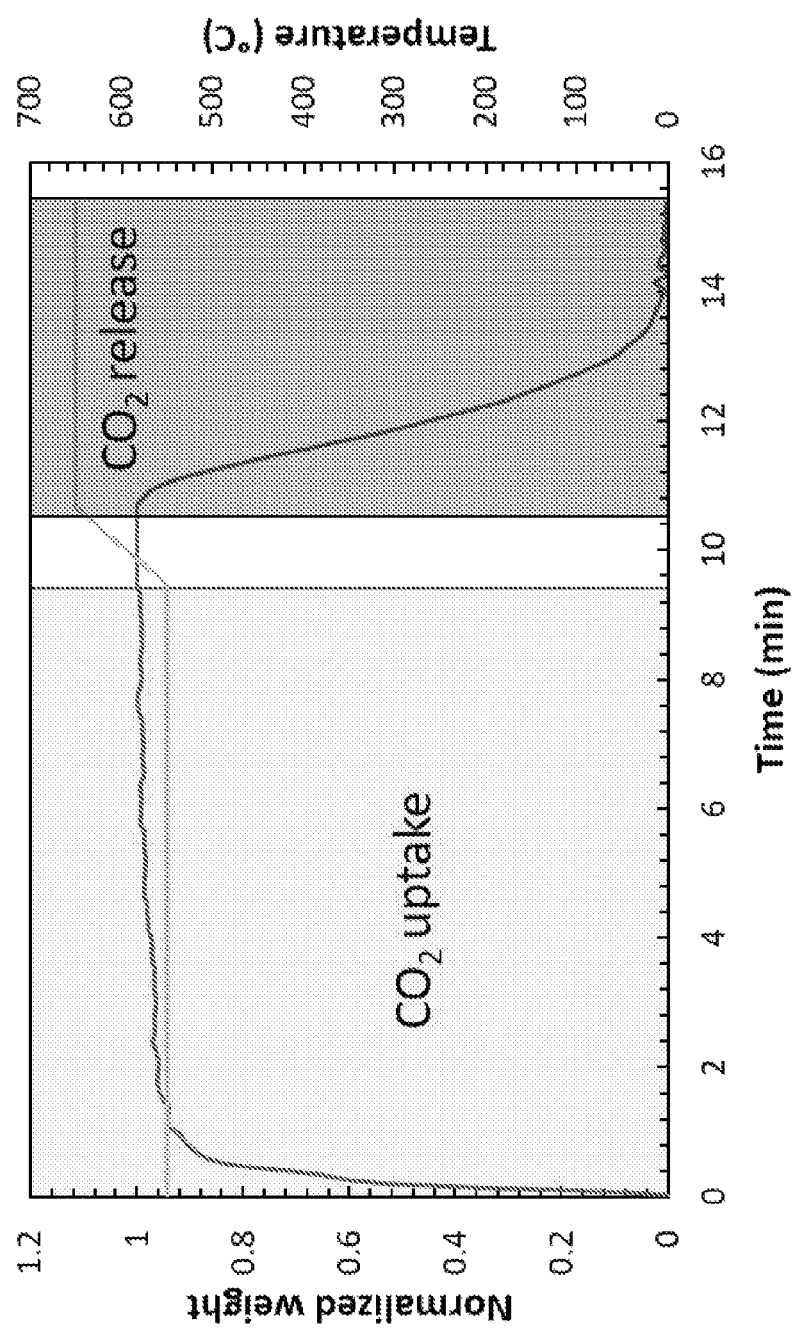
FIG. 7 shows experimental carbon dioxide ($CO_2$) uptake and release in $Ca_2Fe_2O_5$ particles as a function of temperature.

Another set of experiments was carried out in the TGA to assess the $CO_2$ capture performance of $Ca_2Fe_2O_5$. Freshly prepared $Ca_2Fe_2O_5$ sample was heated up to 550° C. and subjected to 40% $CO_2$ (total flow 200 ml/min, balanced with $N_2$). As seen from FIG. 7, the weight of the sample showed an increase due to the formation of $CaCO_3+Fe_2O_3$ arising from the decomposition of $Ca_2Fe_2O_5$ in presence of $CO_2$ and its subsequent capture. Once $CaCO_3+Fe_2O_3$ was formed, the temperature was raised to 650° C. where the sample decomposed and a weight drop was observed in the TGA, which was due to the release of $CO_2$ and formation of $Ca_2Fe_2O_5$.

B. Fixed Bed Experiments as a Simulated Moving Bed

Figure 8:
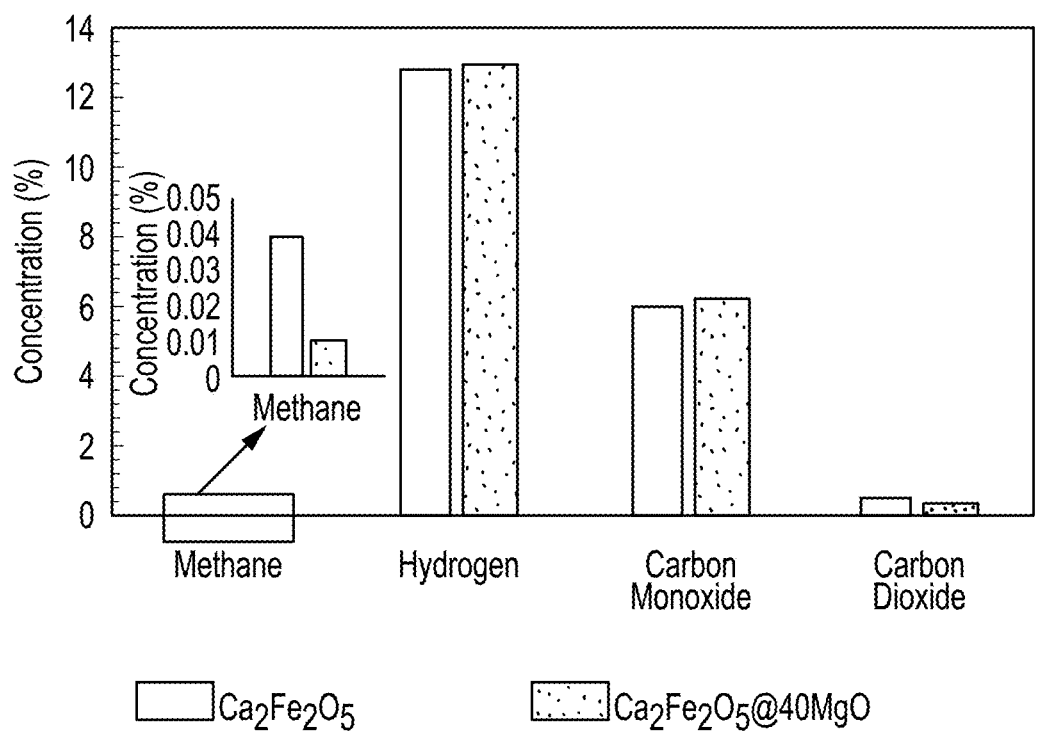
FIG. 8 shows experimental values for steady state concentration profiles of products from fixed bed experiments run with the unsupported and supported $Ca_2Fe_2O_5$ particles at 1000° C.

Experiments were carried out in a simulated co-current moving bed reactor scheme to determine any effects of MgO addition to $Ca_2Fe_2O_5$ on parameters like methane conversion, syngas selectivity and H2:CO ratio. An operating temperature of 1000° C. was maintained during the experiment. The ceramic reactor was loaded with fully oxidized sample at the top and partially reduced sample at the bottom in a 1:3 ratio (oxidized to partially reduced) to simulate a co-current moving bed. $CH_4$ (20% with total flowrate of 25 ml/min) was provided into the reactor from the top and gases exiting the reactor from bottom were analyzed using a mass spectrometer. FIG. 8 and Table 1 depict the concentration of the product gas and performance of these metal oxides.

TABLE 1

Performance of the unsupported and supported $Ca_2Fe_2O_5$ fixed bed runs at 1000° C.

| Oxygen Carrier Particle | CH4 conversion (%) | Syngas selectivity (%) | H2:CO ratio |
|---|---|---|---|
| Ca2Fe2O5 | 99.52 | 95.52 | 2.08 |
| Ca2Fe2O5@ 40% MgO | 99.88 | 98.08 | 2.03 |

Methane conversion of >99% was obtained for both the samples with an $H_2$:CO ratio of ~2:1, which makes this syngas capable of being used for production of synthetic fuels and higher hydrocarbons through Fisher-Tropsch synthesis. Higher selectivity was obtained when MgO was used as a support because of decrease in adsorption energy of CO as studied using Density Functional Theory (DFT). In the absence of MgO, CO does not desorb readily and as a result gets further oxidized to produce $CO_2$.

Figure 9:
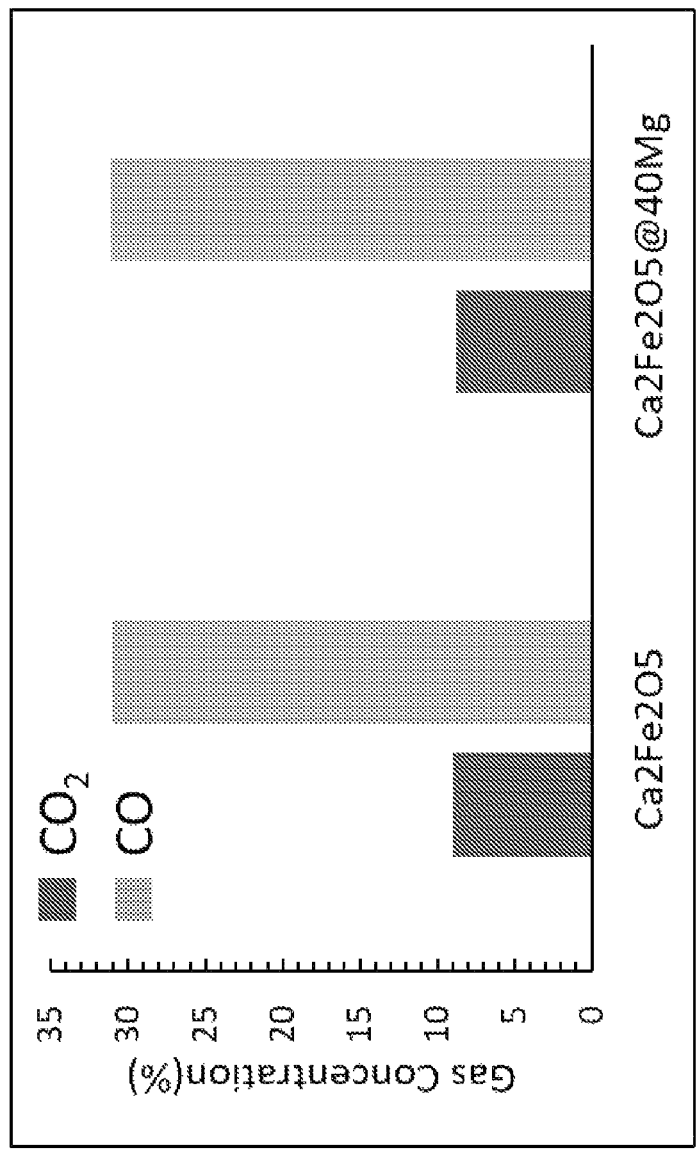
FIG. 9 shows experimental values for regeneration of reduced unsupported and supported $Ca_2Fe_2O_5$ particles in carbon dioxide ($CO_2$).

FIG. 9 shows the regeneration of reduced $Ca_2Fe_2O_5$ using $CO_2$. The regeneration of reduced samples was carried out by sending 25 ml/min of total gas flow with 40% $CO_2$ at 1000° C. and 1 atm. Both the oxygen carriers showed complete regeneration in $CO_2$, and the CO yields obtained were close to the thermodynamic limit.

C. Thermodynamic Estimation of the Flue Gas Capture Reactor

Figure 10:
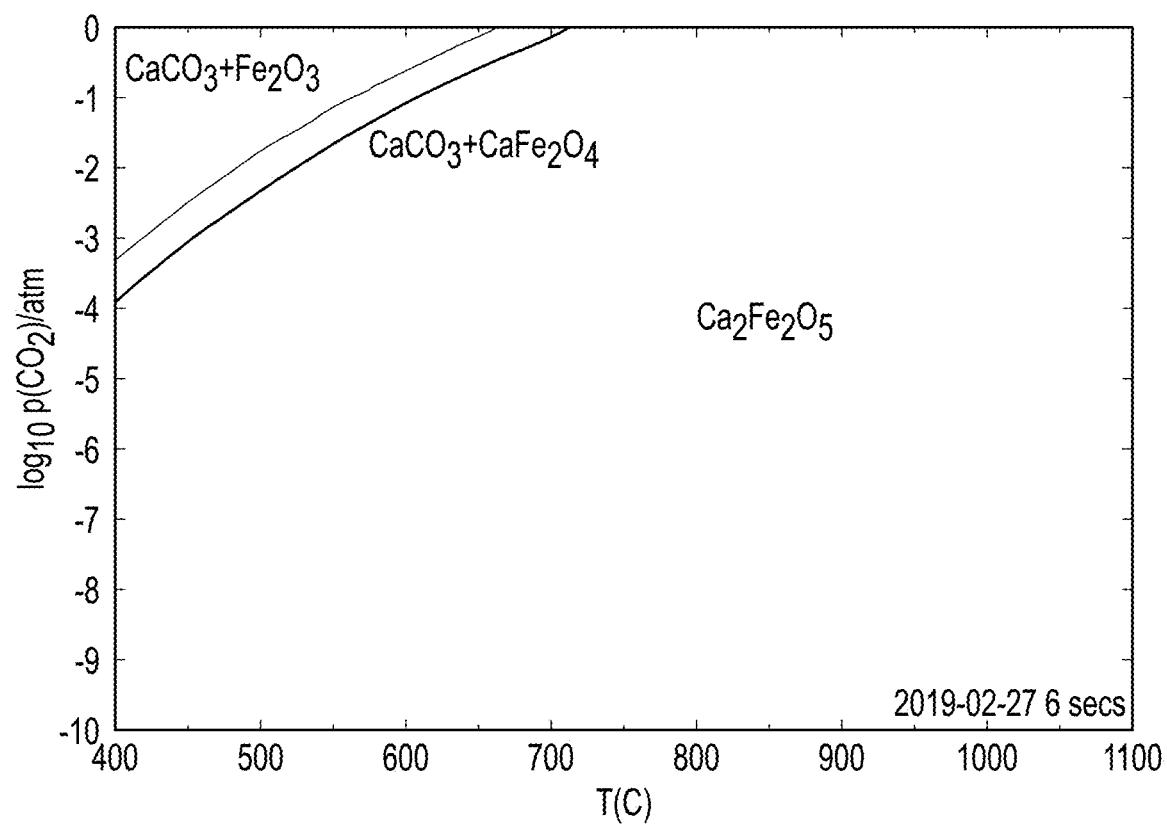
FIG. 10 is a phase diagram for $Ca_2Fe_2O_5$ particles with log(ppCO$_2$) versus temperature.
Figure 11:
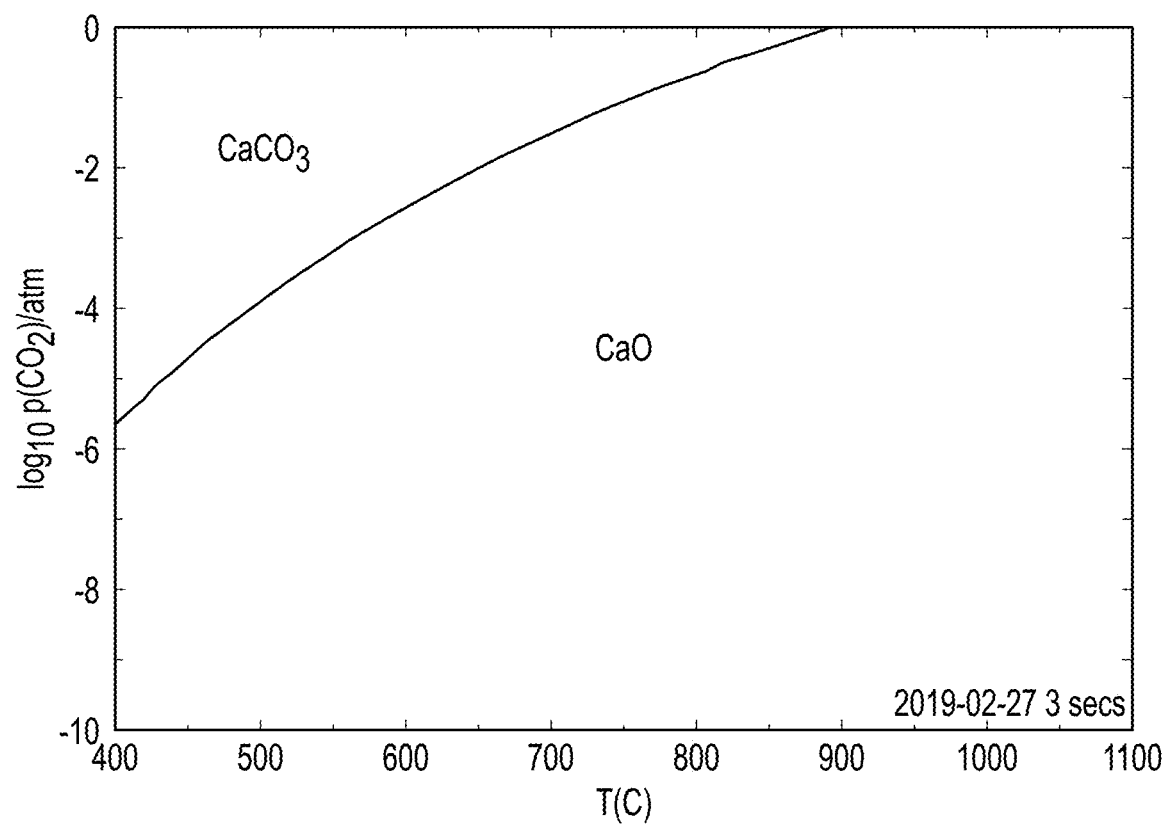
FIG. 11 is a phase diagram for CaO particles with log(ppCO$_2$) versus temperature.

FIG. 10 shows a phase diagram for $Ca_2Fe_2O_5$ with log (ppCO2) vs temperature. FIG. 11 shows a phase diagram for CaO with log(ppCO2) vs temperature. As seen from the phase diagram in FIG. 11, the $CO_2$ capture or the carbonation step occurs at a lower temperature than the carbonate decomposition step. For a pure stream of $CO_2$, the $CaCO_3$ need to be decomposed at a temperature greater than 900° C.

From FIG. 10 and FIG. 11, it is evident that the decomposition temperature of $CaCO_3+CaFe_2O_4$ to $Ca_2Fe_2O_5$ is 720° C., which is much lower than the 900° C. for $CaCO_3$ to CaO. Thus, $Ca_2Fe_2O_5$ shows synergy between Ca and Fe which makes this mixed metal oxide a suitable candidate for exemplary chemical looping systems disclosed herein. Further, the Fe in $Ca_2Fe_2O_5$ is in +3 oxidation state, which is can be easily reduced to metallic Fe with a hydrocarbon stream. With the reactor schemes disclosed and contemplated herein, this will assist in the conversion of this feed into syngas and/or hydrogen.

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, $75^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

We claim:

1. A method of operating a reactor system, the method comprising:
   providing oxygen carrier particles to a first reactor, the oxygen carrier particles comprising a support material and metal oxide;
   providing flue gas comprising carbon dioxide ($CO_2$) to the first reactor;
   operating the first reactor at a temperature of 300° C. to 700° C.;
   collecting a first reactor gas output comprising less than 1 ppb $CO_2$;
   providing the oxygen carrier particles to a second reactor;
   providing a hydrocarbon stream to the second reactor;
   operating the second reactor at a temperature of 500° C. to 1100° C.;
   collecting a second reactor gas output comprising hydrogen gas ($H_2$) and carbon monoxide (CO);
   providing the oxygen carrier particles to a third reactor;
   providing an oxidizing stream to the third reactor; and
   collecting a third reactor gas output comprising carbon monoxide (CO).

2. The method of operating the reactor system according to claim 1, wherein the oxidizing stream comprises steam ($H_2O$) and carbon dioxide ($CO_2$); and
   wherein the third reactor gas output further comprises hydrogen gas ($H_2$).

3. The method of operating the reactor system according to claim 2, wherein the oxidizing stream further comprises air.

4. The method of operating the reactor system according to claim 1, wherein the oxidizing stream comprises an oxide of nitrogen ($NO_x$) and carbon dioxide ($CO_2$); and
   wherein the third reactor gas output further comprises nitrogen ($N_2$).

5. The method of operating the reactor system according to claim 1, wherein the metal oxide is an oxide of calcium (Ca), iron (Fe), nickel (Ni), copper (Cu), manganese (Mn), cobalt (Co), magnesium (Mg), sodium (Na), potassium (K), lithium (Li), strontium (Sr), or barium (Ba).

6. The method of operating the reactor system according to claim 1, wherein a metal oxide-metal carbonate solid-phase mixture is formed when the oxygen carrier particles contact the flue gas.

7. The method of operating the reactor system according to claim 6, wherein the metal oxide-metal carbonate solid-phase mixture includes one or more carbonates of calcium (Ca), magnesium (Mg), sodium (Na), potassium (K), lithium (Li), strontium (Sr), or barium (Ba).

8. The method of operating the reactor system according to claim 1, wherein support material of the oxygen carrier particles comprise silica ($SiO_2$), magnesia (MgO), alumina ($Al_2O_3$), ceria ($CeO_2$), Titania ($TiO_2$), zirconia ($ZrO_2$), or combinations thereof.

9. The method of operating the reactor system according to claim 8, wherein the oxygen carrier particles comprise 20 weight percent (wt %) to 80 wt % support material.

10. The method of operating the reactor system according to claim 1, wherein the first reactor is operated at a temperature of 400° C. to 660° C.

11. The method of operating the reactor system according to claim 10, wherein the second reactor is operated at a temperature of 800° C. to 1100° C.

12. The method of operating the reactor system according to claim 1, further comprising:
    providing the oxygen carrier particles to a fourth reactor;
    providing an air stream to the fourth reactor;
    collecting a fourth reactor gas output comprising depleted air; and
    providing the oxygen carrier particles to the first reactor.

13. The method of operating the reactor system according to claim 1, further comprising operating a second reactor system, comprising:
    providing second oxygen carrier particles to a fifth reactor;
    providing a second hydrocarbon stream to the fifth reactor;
    collecting a fifth reactor gas output comprising either hydrogen gas ($H_2$) and carbon monoxide (CO), or hydrogen gas ($H_2$), carbon monoxide (CO), carbon dioxide ($CO_2$) and steam ($H_2O$);
    providing the second oxygen carrier particles to a sixth reactor;
    providing air to the sixth reactor;
    collecting a sixth reactor gas output comprising depleted air; and
    providing heat generated in the sixth reactor to the second reactor.

14. The method according to claim 1, further comprising providing the oxygen carrier particles from the third reactor to a riser; and
    providing the oxygen carrier particles from the riser to the first reactor.

15. The method according to claim 1, wherein the hydrocarbon stream includes coal, biomass, natural gas, shale gas, biogas, petroleum coke, or combinations thereof.

16. A method of operating a reactor system, the method comprising:
    providing oxygen carrier particles to a first reactor, the oxygen carrier particles comprising a support material and metal oxide;
    providing flue gas comprising carbon dioxide ($CO_2$) to the first reactor;
    operating the first reactor at a temperature of 300° C. to 700° C.;
    collecting a first reactor gas output comprising less than 1 ppb $CO_2$;
    providing the oxygen carrier particles to a second reactor;
    providing a hydrocarbon stream to the second reactor;
    providing an oxidizing stream to the second reactor such that the oxidizing stream is counter-current to the oxygen carrier particles;
    operating the second reactor at a temperature of 720° C. to 1100° C.; and
    collecting a second reactor gas output comprising hydrogen gas ($H_2$) and carbon monoxide (CO).

17. The method according to claim 16, wherein the hydrocarbon stream is provided to the second reactor such that the hydrocarbon stream is co-current with the oxygen carrier particles; and
    wherein the oxidizing stream is provided to the second reactor such that the oxidizing stream is counter-current to the oxygen carrier particles;
    wherein the hydrocarbon stream includes coal, biomass, natural gas, shale gas, biogas, petroleum coke, or combinations thereof;
    wherein the oxidizing stream comprises steam ($H_2O$) and carbon dioxide ($CO_2$);
    wherein the metal oxide is an oxide of calcium (Ca), iron (Fe), nickel (Ni), copper (Cu), manganese (Mn), cobalt (Co), magnesium (Mg), sodium (Na), potassium (K), lithium (Li), strontium (Sr), or barium (Ba); and wherein the oxygen carrier particles further comprise support material comprising silica ($SiO_2$), magnesia (MgO), alumina ($Al_2O_3$), ceria ($CeO_2$), Titania ($TiO_2$), zirconia ($ZrO_2$), or combinations thereof.

\* \* \* \* \*